May 30, 1950  O. D. SMITH  2,509,458
BELT DRIVE FOR MACHINE TOOLS
Filed July 2, 1948  4 Sheets-Sheet 1

INVENTOR
OLIVER DOUGLAS SMITH
by Walter S. Heston
ATTORNEY

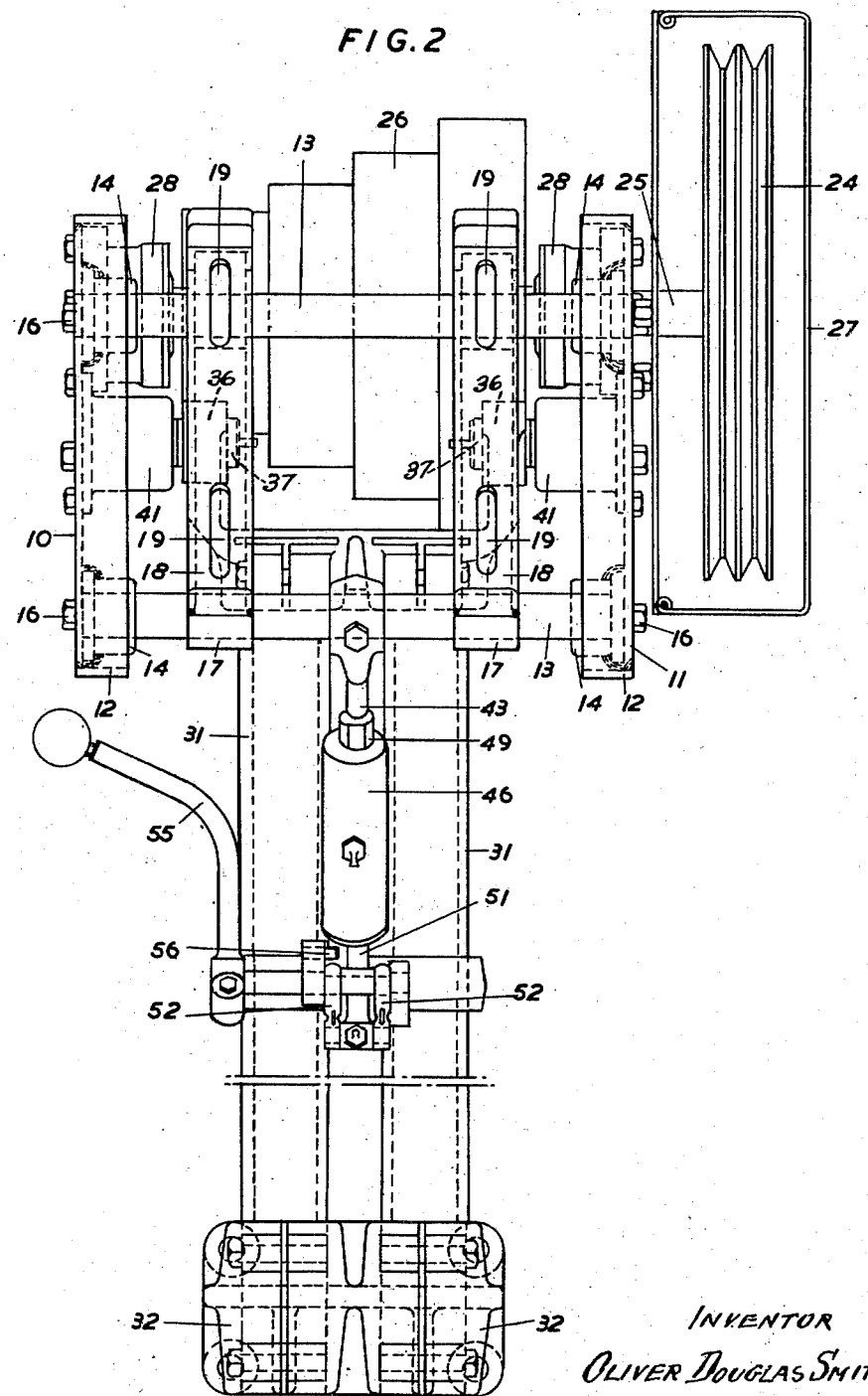

May 30, 1950 O. D. SMITH 2,509,458
BELT DRIVE FOR MACHINE TOOLS
Filed July 2, 1948 4 Sheets-Sheet 3
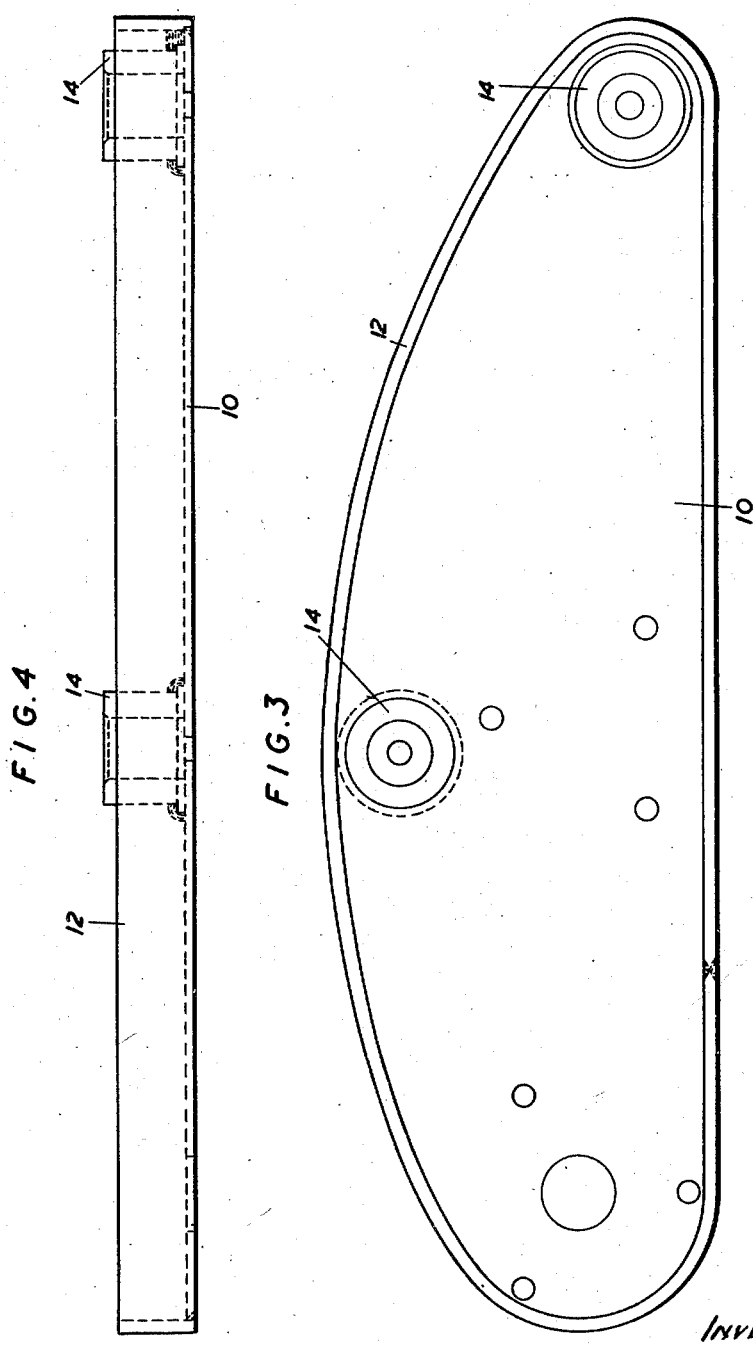
INVENTOR
OLIVER DOUGLAS SMITH
by Walter S. Pleston
ATTORNEY May 30, 1950            O. D. SMITH            2,509,458

BELT DRIVE FOR MACHINE TOOLS

Filed July 2, 1948                                                  4 Sheets-Sheet 4

INVENTOR:
OLIVER DOUGLAS SMITH
by Walter S. Pleston
ATTORNEY

Patented May 30, 1950

2,509,458

UNITED STATES PATENT OFFICE 2,509,458

BELT DRIVE FOR MACHINE TOOLS

Oliver Douglas Smith, Lapworth, England

Application July 2, 1948, Serial No. 36,601
In Great Britain July 10, 1947

9 Claims. (Cl. 248—16)

This invention relates to improvements in belt drives for machine tools and refers particularly to self-contained drives in which a countershaft from which the machine is driven by a belt is itself driven by a belt from a motor, and the motor and countershaft are mounted on the machine or on a framework adjacent the machine.

In the specification of U. S. Patent No. 2,372,342 a drive of that type is described in which the driving motor and countershaft are mounted on a rigid frame pivoted to oscillate about an axis parallel to that of the shaft to be driven, and the arrangement is such that the weight of the motor tending to rock the frame about its axis tensions a belt transmitting the drive from the countershaft to the driven shaft of the machine, the tensioning force being regulated by spring means.

The object of the present invention is to provide an improved construction for a drive of that kind whereby manufacture and maintenance are facilitated.

According to my invention, in a belt drive of the type set forth for machine tools the frame carrying the mechanism is formed by two spaced flanged side members or plates rigidly connected by transverse members which carry the mounting for the driving motor, and the countershaft and the members about which the frame oscillates are mounted in bearings carried in housings detachably secured to the inner faces of the side members.

The flanged side members or plates are preferably formed as pressings or stampings in steel plate or other metal but they may be fabricated from sheet metal or they may be formed as ordinary castings or die-castings in light alloy or other suitable metal.

The belt transmitting the drive from the countershaft to the machine is tensioned by the weight of the motor tending to rock the frame about its axis, and the tensioning force is conveniently regulated by a spring assembly consisting of a piston working in a closed cylinder with a compression spring arranged between each end of the cylinder and the piston.

The piston-rod is coupled by a link to the frame which carries the motor while the other end of the cylinder may be pivotally connected at one end to a fixed point on the pillar or stand carrying the frame. Preferably however, the cylinder is connected to the pillar or stand through an angularly movable or throwover linkage operated by a lever and so arranged that when the lever is moved in one direction the tension of the belt is relieved and changing of the belt from one pulley to another on the machine is greatly facilitated. Preferably the link which connects the piston-rod to the movable frame is formed by a rod adjustably screwed into an axial bore in the piston-rod so that the effective length of the link can be adjusted to control the tension of the belt, the rod being locked in the adjusted position by a lock-nut.

The two side members of the frame, whether pressings or castings, are preferably identical so that only one set of tools or dies is required to produce them, and as the motor and countershaft can readily be reversed the same unit can be assembled or changed over to give an output drive from either side of the frame.

One practical form of driving unit in accordance with my invention is illustrated by way of example in the accompanying drawings in which—

Figure 2 is a plan with the motor removed.

Figure 3 is a side elevation of one of the side members of the frame.

Figure 4 is a plan of the side member.

Figure 1:
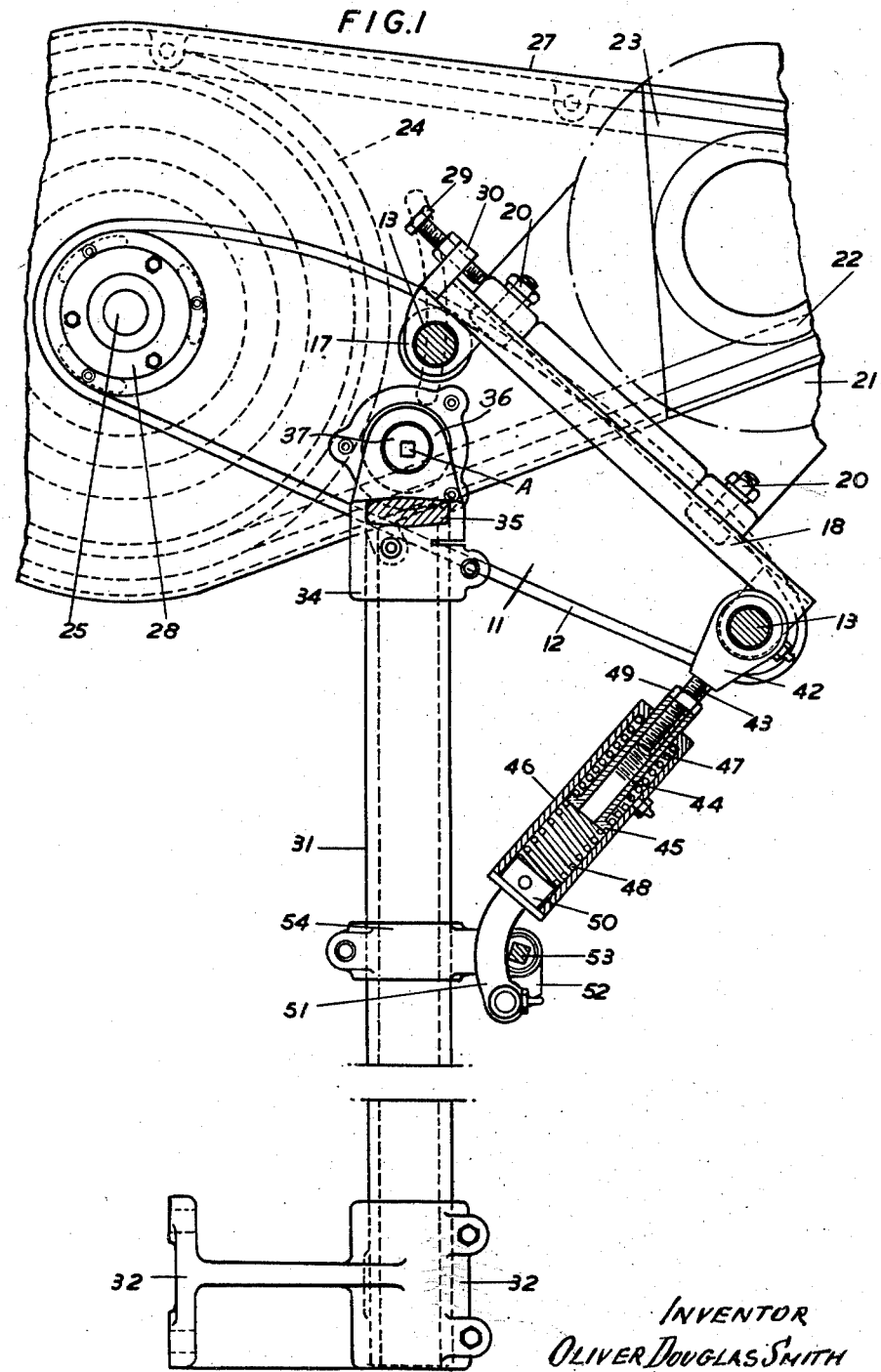
Figure 1 is a side elevation in part section of the driving unit.
Figure 6:
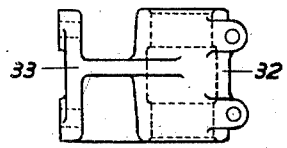
Figures 5 and 6 are a plan and a side elevation respectively of the bottom bracket for the supporting pillars.
Figure 8:
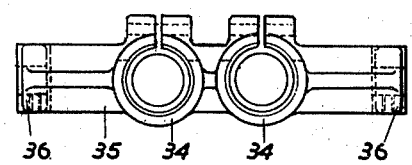
Figures 7 and 8 are an end elevation and inverted plan respectively of the supporting bracket for the frame.
Figure 5:
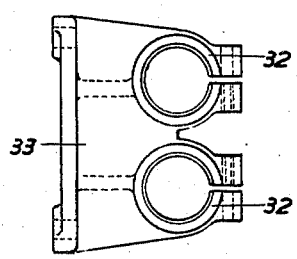
Figure 7:
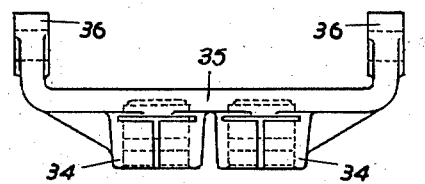
Figure 9:
Figure 9 is a plan of one of the cross-members which connect the side members of the frame.
Figure 10:
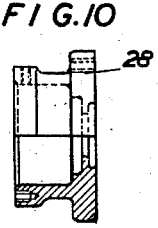
Figure 10 is an elevation in half-section of a bearing housing for the countershaft.
Figure 11:
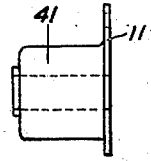
Figure 11 is an elevation of one of the housings for the main rocking bearing.
Figure 12:
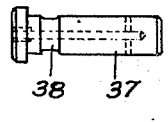
Figure 12 is a plan of one of the rocking bearing pins.
Figure 13:
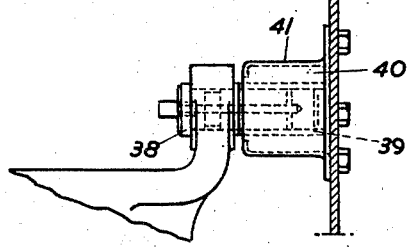
Figure 13 is a fragmentary elevation of one of the rocking bearings assembled.

In the driving unit illustrated the main parts of the frame are two side members consisting of stout sheet metal pressings 10, 11. These are formed with a deep peripheral flange 12 which may be integral or may be welded to the flat walls of the members.

The side members are rigidly connected and are held at a fixed distance apart by two spaced cylindrical steel bars 13, 13 of which the ends are received in hollow bosses 14, 14 welded to the inner faces of the side members. The ends of the bars are drilled axially at 15 and tapped to receive studs 16 which are passed through aligned holes in the side members, and when the studs are tightened they draw the side members together against the ends of the bars.

Lugs 17 mounted on the bars 13 are welded or otherwise secured to the underside of spaced channel section rails 18 extending at right angles to the bars. The lugs are preferably slidably clamped on the bars so that the width between the rails can be readily adjusted to suit motors of different type or sizes. The rails are slotted at 19 to receive bolts 20 for securing to the rails an electric motor 21. A grooved pulley 22 on the motor spindle is adapted to drive through V belts 23 a grooved pulley 24 on a countershaft 25 on which is mounted a stepped or coned pulley 26 to receive a belt for driving a lathe or other machine tool. The pulleys and belts are enclosed by a sheet metal guard or cover 27. The countershaft is rotatably mounted in bearings in housings 28 bolted to the inner faces of the side members 10, 11.

The tension of the belts 23 is adjusted in the usual way by studs 29 adjustably screwed through extensions 30 of the lugs 17 at one end of the rail 18 and bearing against the base of the motor.

The frame carrying the motor and countershaft is supported to rock about a horizontal axis A at the upper end of two parallel tubular supporting pillars 31, 31. The lower ends of the pillars are clamped in split sleeves 32 integral with a bracket 33 adapted to be bolted to the frame of the machine to be driven. By sliding the pillars through the sleeves the height of the unit can be readily adjusted to suit different machines.

In a modification the frame may be supported in a similar manner on a single pillar.

The upper ends of the pillars are clamped in split hollow bosses 34 on the base of a forged or other U-shaped bracket 35 having spaced upstanding parallel limbs 36 spaced apart at such a distance that the frame can fit between them.

The limbs 36 are bored horizontally to receive headed pins 37 which are locked in the limbs by set screws engaging in annular grooves 38 in the pins and which form the pivot on which the frame rocks. These pins enter metal sleeves 39 bonded to rubber bushes 40 of which the outer surfaces are bonded to the inner surfaces of flanged housings 41 which are bolted to the inner faces of the side members 10, 11 of the frame. The pins may be a push-in fit in the sleeves or they may be keyed to the sleeves so that the whole of the relative angular movement between the frame and its mountings is absorbed by the rubber bushes.

In either case the rubber bushes isolate the frame with the motor and countershaft from the fixed mounting and eliminate or reduce noise and vibration.

Instead of using bonded rubber bushes I may use rubber bushes which are simply compressed between the inner sleeve and the housing.

Alternatively, instead of rubber bushes I may use bushes of plastic material or bushes of any other suitable material impregnated with lubricant.

The weight of the motor tends to rock the frame about its pivot in a direction to tension the belt between the countershaft and the machine, and the tensioning force is regulated by spring means which are so arranged as to allow the tension to be relieved when changing the belt from one step of the pulley 25 to another. For this purpose a crosshead 42 is pivotally mounted on the cross bar 13 at the end remote from the countershaft and has a screwed shank 43 which is screwed into the hollow piston-rod 44 of a piston 45 working in a closed cylinder 46. Compression springs 47 and 48 are arranged between the piston and each end of the cylinder. By rotating the piston-rod the shank 43 is moved axially to adjust the effective length of the connection between the crosshead and the piston, the parts being locked in the adjusted position by a lock-nut 49. The lower end of the cylinder is closed by a plug 50 to which is secured one end of a curved link 51. The other end of this link is pivotally mounted between the free ends of spaced arms 52 keyed on a spindle 53 which is rotatably mounted in a bracket 54 adjustably clamped on the pillar 31. A lever handle 55 is fixed on one end of the spindle 53.

Normally, as shown in Figure 1, the arms 52 extend substantially vertically downwards from the spindle 53, and the axis of the pivotal connection between the arms and the link 51 lies on the opposite side of the axis of the spindle from a prolongation of the axis of the cylinder 46. In this position the whole of the weight of the motor which is not balanced by the countershaft is acting to tension the driving belt under the control of the springs in the cylinder.

When it is desired to change the driving belt from one pulley to another on the machine and countershaft the spindle 53 is moved angularly by the handle 55 to move the connection between the arms and the link over centre with respect to the spindle and carry it round through an angle of rather more than 180° until the arms are in a substantially vertical position and the link engages and locks against a stop-peg 56. In this position the unbalanced part of the weight of the motor is supported by the cylinder and the lower spring 47, and the tension of the belt is relieved so that the belt can be readily moved. The handle 55 is then swung round into its original position.

If it should be necessary at any time to replace the bearings for the countershaft or the bushes on which the frame rocks this is a very simple matter as the two side plates can be separated by removing the studs 16 which are screwed into the crossbars 13.

I claim:

1. A belt driving unit of the kind specified for machine tools comprising a motor, a countershaft driven by said motor, and a rockable frame on which said motor and countershaft are mounted adjacent opposite ends thereof, said frame comprising two parallel spaced flanged side members, hollow bosses rigidly secured to the inner faces of said side members, spaced transverse bars of which the ends are received in said bosses, and studs passing through holes in the side members into tapped axial bores in the ends of the bars to secure said side members to said bars.

2. A belt driving unit of the kind specified for machine tools comprising a frame including two parallel spaced flanged side members, spaced bars at right angles to said side members extending between said side members and secured at their ends thereto, lugs adjustably mounted on said bars, rails extending between complementary lugs on the bars and rigidly secured to said lugs, a motor mounted on said rails, a countershaft driven by said motor and rotatably mounted on said side members, and aligned horizontal pivot members which are mounted in bearings on said side members and about which said frame can oscillate.

3. A belt driving unit of the kind specified for machine tools comprising a frame including two parallel spaced flanged side members and spaced transverse members extending between said side members and rigidly secured at their ends thereto, a motor mounted on said side members adjacent one end of said frame, a countershaft driven by said motor rotatably mounted in the frame adjacent the other end thereof, aligned bearings mounted on the inner faces of said side members intermediate the motor and countershaft, aligned pivot pins mounted in said bearings for the frame to rock about, a bracket in which said pins are rigidly mounted, and a vertical support on the upper end of which said bracket is mounted.

4. A belt driving unit as set forth in claim 3 in which said bearings for the pivot pin comprise sleeves in which said pins are received, rubber bushes surrounding and bonded to said sleeves, and housings enclosing and bonded to said bushes, said housings being detachably secured to the inner faces of the side members of the frame.

5. A belt driving unit as set forth in claim 3 in which the support for said bracket comprises parallel spaced vertical pillars having means for adjustably securing them at their lower ends in a bracket adapted to be secured to a machine to be driven.

6. A belt driving unit of the kind specified for machine tools comprising a frame including parallel spaced flanged side members and spaced transverse members extending between said side members and rigidly secured at their ends thereto, a motor mounted on said side members adjacent one end of said frame, a countershaft rotatably mounted in the frame adjacent the other end thereof, pivotal means for supporting said frame to rock about a horizontal axis intermediate said motor and said countershaft, a vertical pillar carrying said pivotal means at its upper end, a closed cylinder pivotally connected at its lower end to said pillar, a piston working in said cylinder, a link connecting said piston to the motor end of said frame, and compression springs arranged between said piston and opposite ends of said cylinder to control the rocking movement of the frame.

7. A belt driving unit as set forth in claim 6 in which said cylinder is connected to the pillar by a manually operable throw-over linkage to permit vertical displacement of the cylinder relative to the frame.

8. A belt driving unit as set forth in claim 6 in which the pivotal connection between the cylinder and the pillar comprises a curved link rigid with and extending downwardly from said cylinder, a bracket mounted on the pillar, a spindle rotatably mounted in said bracket, a pair of parallel arms keyed on said spindle, a pivotal connection between said arms and the lower end of said link which enters between them, and a handle fixed on one end of said spindle.

9. A frame for a belt driving unit of the kind specified comprising two parallel spaced flanged side members, spaced transverse members which extend between and are detachably secured at their ends to said side members and which are adapted to support a driving motor stationarily in relation to said side members, and said side members including aligned bearings, respectively, so as to define a pivot axis of said frame.

OLIVER DOUGLAS SMITH.

REFERENCES CITED

The following references are of record in the file of this patent:

UNITED STATES PATENTS

| Number | Name | Date |
| --- | --- | --- |
| 1,926,392 | Kritzer | Sept. 12, 1933 |
| 2,001,111 | Rhodes et al. | May 14, 1935 |
| 2,372,342 | Smith et al. | Mar. 27, 1945 |